US012637613B2

(12) United States Patent
Hens et al.

(10) Patent No.: US 12,637,613 B2
(45) Date of Patent: May 26, 2026

(54) METHOD TO MODIFY THE SURFACE OF QUANTUM DOTS AND A METHOD TO PREPARE A DISPERSION OF SURFACE MODIFIED QUANTUM DOTS

(71) Applicant: UNIVERSITEIT GENT, Ghent (BE)

(72) Inventors: Zeger Hens, Ghent (BE); Jari Leemans, Ghent (BE)

(73) Assignee: UNIVERSITEIT GENT, Ghent (BE)

( * ) Notice: Subject to any disclaimer, the term of this patent is extended or adjusted under 35 U.S.C. 154(b) by 549 days.

(21) Appl. No.: 18/031,464

(22) PCT Filed: Oct. 14, 2021

(86) PCT No.: PCT/EP2021/078513
§ 371 (c)(1),
(2) Date: Apr. 12, 2023

(87) PCT Pub. No.: WO2022/079198
PCT Pub. Date: Apr. 21, 2022

(65) Prior Publication Data
US 2023/0383177 A1 Nov. 30, 2023

(30) Foreign Application Priority Data
Oct. 15, 2020 (EP) ..................................... 20201981

(51) Int. Cl.
*C09K 11/02* (2006.01)
*C09K 11/74* (2006.01)

(52) U.S. Cl.
CPC ........ *C09K 11/025* (2013.01); *C09K 11/7492* (2013.01)

(58) Field of Classification Search
CPC .......................... C09K 11/025; C09K 11/7492
USPC ...................................................... 252/301.36
See application file for complete search history.

(56) References Cited

PUBLICATIONS

Firdaus, et al., "Enhancement of the Photovoltaic Performance in P3HT: PbS Hybrid Solar Cells Using Small Size PbS Quantum Dots" Journal of Applied Physics, vol. 116, No. 9, Sep. 7, 2014, pp. 094305-1-094305-7.
Beygi, et al., "Solution Phase Surface Functionalization of PbS Nanoparticles with Organic Ligands for Single-Step Deposition of P-type Layer of Quantum Dot Solar Cells", Applied Surface Science, vol. 459, Aug. 6, 2018, pp. 562-571.
Houck, et al., "Facile Exchange of Tightly Bonded L-type Oleylamine and Diphenylphosphine Ligands on Copper Indium Diselenide Nanocrystals Mediated by Molecular Iodine", Chemistry of Materials, vol. 30, No. 22, Nov. 6, 2018, pp. 8359-8367.
(Continued)

*Primary Examiner* — Anita Nassiri-Motlagh
(74) *Attorney, Agent, or Firm* — Workman Nydegger

(57) ABSTRACT

A method to modify the surface of III-V quantum dots. III-V quantum dots provided with X type ligands and L type ligands at their outer surface are dispersed in a solvent include an additional compound. The additional compound has an organic acid of formula RYH or an organic salt of formula RYH+Z− and has at least one acidic proton H+ having a pKa in water equal to or lower than 16. During dispersion the acidic proton H+ protonates at least part of the L type ligands and at least part of the X type ligands are replaced. Surface modified quantum dots, dispersions having such surface modified quantum dots and to the use of such dispersions are disclosed.

7 Claims, 8 Drawing Sheets

(56)          References Cited

PUBLICATIONS

Grigel, et al., "InAs Colloidal Quantum Dots Synthesis via Aminopnictogen Precursor Chemistry", Journal of the American Chemical Society, vol. 38, No. 41, Oct. 10, 2016, pp. 13485-13488.

International Search Report from corresponding PCT Application No. PCT/EP2021/078513, Dec. 23, 2021.

Extended European Search Report from corresponding European Application No. 20201981.6, Apr. 22, 2021.

Moreels, et al., "Size-Dependent Optical Properties of Colloidal PbS Quantum Dots", ACSNano, vol. 3, No. 10, Sep. 25, 2009, pp. 3023-3030.

METHOD TO MODIFY THE SURFACE OF QUANTUM DOTS AND A METHOD TO PREPARE A DISPERSION OF SURFACE MODIFIED QUANTUM DOTS

FIELD OF THE INVENTION

The present invention relates to a method to modify the surface of quantum dots in particular a method to modify the surface terminations of quantum dots and/or a method to passivate the surface of quantum dots, in particular of III-V quantum dots. The invention further relates to surface modified quantum dots, in particular surface modified III-V quantum dots, to a method to prepare a dispersion comprising surface modified quantum dots and to the use of such dispersion.

BACKGROUND ART

Colloidal quantum dots (QDs) are semiconductor nanocrystals that absorb light at wavelengths depending on their size and shape. They have applications in the visible region as well as in the (near) infrared. Main applications of quantum dots in the visible region comprise color-conversion and light emission applications. In the infrared colloidal quantum dots are promising candidates for low cost near infrared (NIR) photodetectors. Quantum dot photodetectors typically have a layer of nanocrystalline material embedded between charge transport layers and electrodes. After absorption in the quantum dot layer (for example an InAs quantum dot layer), mobile charge carriers can be separated to the respective electrode yielding a measurable electronic signal.

Devices that use quantum dots to convert an optical signal into an electric signal, such as quantum dot photodiodes or solar cells, typically use a thin film of densely packed quantum dots with sufficient electronic conductivity. To achieve this, the long insulating ligands that passivate the surface of as-synthesized quantum dots have to be replaced by shorter adsorbents.

A first procedure to passivate the surface of quantum dots involves extraction of the long ligands from the deposited film by exposure to a chemical bath comprising shorter ligands. Since the volume contraction caused by the long/short ligand exchange leads to ruptures and cracks in the quantum dot films, such procedure typically leads to a layer-by-layer deposition protocol in which successive quantum dot layers are deposited and chemically treated to build up the photo-active layer.

An alternative procedure comprises the formulation of a quantum dot dispersion, in which the quantum dots are stabilized by the intended short ligands, instead of the original long ligands. A major problem towards formulating such quantum dot inks, for example InAs quantum dot inks, is identifying how the initial surface ligands can be exchanged, whilst ensuring that the dispersion of surface exchanged quantum dots has sufficient stability to allow the subsequent processing, such as the formation of smooth quantum dot films.

There remains a need to provide an improved method to passivate the surface of quantum dots in order to allow the formation of an electronically conductive quantum dot film that can be used for example as the photo-active layer in a photodetector.

SUMMARY OF THE INVENTION

It is an object of the present invention to provide a method to modify the surface of quantum dots, in particular a method to modify the surface terminations of quantum dots and/or a method to passivate the surface of quantum dots.

It is another object of the present invention to provide an exchange protocol for the ligands of quantum dots, in particular III-V quantum dots as for example InP, InAs or In(As, P) quantum dots.

It is a further object of the present invention to provide an exchange protocol to exchange the ligands of quantum dots, in particular III-V quantum dots, whereby X type ligands as well as L type ligands are displaced simultaneously.

Furthermore, it is an object of the present invention to provide an exchange protocol to exchange the ligands of quantum dots thereby removing the ligands of the quantum dots while replacing at least part of them with a ligand of choice.

It is still a further object of the present invention to provide a method to modify and/or passivate the surface of quantum dots not requiring strong acids.

It is an object of the present invention to provide a method to modify the surface terminations of quantum dots whereby the method allows to choose the final ligands at the outer surface. The final ligands can be long or short, polar or nonpolar. The method according to the present invention offers a high freedom to design the surface. The surface can be optimized depending on the final application.

It is also an object of the present invention to provide surface modified quantum dots, i.e. quantum dots provided with ligands of choice.

It is a further object of the present invention to provide a method to prepare a dispersion comprising quantum dots, for example an ink comprising quantum dots.

According to a first aspect of the present invention a method to modify the surface of quantum dots, in particular a method to modify the surface terminations of quantum dots, is provided. The method comprises the steps of provilding III-V quantum dots, the quantum dots having X type ligands and L type ligands at their outer surface, with X type ligands being ligands able to donate one electron to the quantum dot to which the X type ligand is bound and with L type ligands being ligands able to donate two electrons to the quantum dot to which the L type ligand is bound;

dispersing the quantum dots in a solvent further comprising an additional compound. The additional compound comprises an organic acid of formula RYH or an organic salt of formula $RYH^+Z^-$. The additional compound has at least one acidic proton $H^+$ having a pKa in water equal or lower than 16 and comprises an R-group comprising at least one carbon atom. The organic acid of formula RYH is preferably selected from the group consisting of carboxylic acids, sulfonic acids, thiols and phenols. The organic salt of formula $RYH^+Z^-$ comprises preferably an organic ammonium ion $RYH^+$ and a negatively charged counterion $Z^-$. The negatively charged counterion $Z^-$ of the organic salt of formula $RYH^+Z^-$ comprises preferably a halide, for example a fluoride, chloride, bromide or iodide.

During the dispersing step the at least one acidic proton $H^+$ of the additional compound, i.e. of the organic acid of formula RYH or of the organic salt of formula $RYH^+Z^-$, protonates at least part of the L type ligands to form protonated L type ligands. Preferably, at least part of the protonated L type ligands are removed (desorbed) from the surface of the quantum dots. Furthermore, during the dispersing step at least part of the X type ligands are removed from the surface of the quantum dots and replaced, for example by the deprotonated additional compound.

In case the additional compound comprises an organic acid of formula RYH, the X type ligands are for example replaced by deprotonated acid (RY$^-$) of the organic acid of formula RYH.

In case the additional compound comprises an organic salt of formula RYH$^+$Z$^-$, the X type ligands are for example replaced by the counterion Z$^-$ of the organic salt of formula RYH$^+$Z$^-$ and/or by the deprotonated conjugated base (RY ligands) of ion RYH$^+$ of the organic salt of formula RYH$^+$Z$^-$.

In case the additional compound comprises an organic salt of formula RYH$^+$Z$^-$, the X type ligands are preferably replaced by the counterion Z$^-$ of the organic salt of formula RYH$^+$Z$^-$. In such case the ligands RY can function as a L type ligand and can bind to the surface of the quantum dots.

Preferably, the acidic proton H$^+$ of the additional compound of formula RYH or of formula RYH$^+$Z$^-$ protonates all or substantially all of the L type ligands. Preferably, the protonated L type ligands are removed from the surface of the quantum dots. Preferably, all or substantially all of the L type ligands are removed from the surface of the quantum dots.

Preferably, all or substantially all of the X type ligands are replaced by deprotonated acid (RY$^-$) of the compound of formula RYH or by the counterion Z$^-$ of the organic salt of formula RYH$^+$Z$^-$ and/or by the deprotonated conjugated base (RY ligands) of ion RYH$^+$ of the organic salt of formula RYH$^+$Z$^-$.

The quantum dots provided in the first step of the method are provided with L type ligands and X type ligands at their outer surface. The quantum dots are thus characterized by a hybrid surface termination. Preferably, the L type ligands are tightly bound to the surface of the quantum dots. This can be demonstrated by $^1$H-NMR in a 2D nuclear overhauser effect spectroscopy and/or 2D-DOSY experiment. The presence of the X-type ligand such as halides can be demonstrated by X-ray photoelectron spectroscopy (XPS), Rutherford Backscattering spectroscopy (RBS) and spectrophotometry.

Preferably, the ratio of the amount of X type ligands present on the surface of the quantum dots over the amount of L type ligands present on the surface of the quantum dots ranges between 10:1 and 1:10. More preferably, the ratio of the amount of X type ligands present on the surface of the quantum dots over the amount of L type ligands present on the surface of the quantum dots ranges between 5:1 and 1:5, between 2:1 and 1:2 or between 1.5:1 and 1:1.5. In some embodiments the amount of X type ligands present on the surface of the quantum dots is equal or substantially equal to the amount of L type ligands present on the surface of the quantum dots.

A L type ligand refers to a ligand that is able to donate two electrons to the central element/quantum dot to which the L type ligand is bound. A L type ligand is thus able to donate two electrons to the ligand-quantum dot bond. Examples of L type ligands comprise NH$_3$, amines, for example primary amines, phosphines and thiols.

A X type ligand refers to a ligand able to donate one electron to the central element/quantum dot to which the X type ligand is bound. A X type ligand is thus able to donate one electron to the ligand-quantum dot bond. Examples of X type ligands comprise halides, such as fluorides, chlorides, bromides and iodides, carboxylates and thiolates.

Preferred quantum dots are provided with halides for example chlorides as X type ligands and amines as L type ligand. Preferably, the ratio of the amount of chlorides to the amount of amines present on the surface of the quantum dots ranges between 10:1 and 1:10 and more preferably between 5:1 and 1:5, between 2:1 and 1:2 or between 1.5:1 and 1:1.5

It is clear that quantum dots can be provided with different L type ligands, with different X type ligands or with different L type ligands and different X type ligands. The quantum dots can for example be provided with amines and phosphines as L type ligands and/or with chlorides and bromides as X type ligands.

The additional compound, for example the organic acid of formula RYH or the organic salt of formula RYH$^+$Z$^-$, has a least one acidic proton having a pKa in water equal or lower than 16. Preferred additional compounds, for example the organic acids of formula RYH or organic salt of formula RYH$^+$Z$^-$, have at least one proton having a pKa in water lower than 10, lower than 6 or lower than 5. It is clear that the additional compound may comprise more than one acidic proton. The deprotonated form of the organic acid of formula RYH is RY$^-$; the deprotonated form of the organic salt of formula RYH$^+$-Z$^-$ is RY.

As mentioned above, the additional compound may comprise organic acids of formula RYH. Organic acids are organic compounds with acidic properties. Examples of organic acids comprise carboxylic acids (whose acidity is associated with their carboxyl group —COOH), sulfonic acids (having a —SO$_2$OH group), alcohols (having an —OH group), thiols (having a —SH group) and phenols.

RY$^-$ refers to a deprotonated organic acid RYH. Preferably, RY$^-$ comprises RCOO$^-$, RSO$_2$O$^-$, RO$^-$ or RS$^-$ with R— comprising an organic group. Some preferred R-groups are mentioned below.

Examples of additional compounds of formula RYH comprise alkanethiols such as dodecanethiol, octanethiol, hexadecanethiol, ethanedithiol and 3-mercapto-1,2-propanediol or fatty acids such as oleic acid, myristic acid and 2-ethylhexanoic acid. Further examples comprise phenol, 3-mercaptopropionic acid, succinic acid, thioglycol and thioglycolic acid.

The additional compound may also comprise an organic salt of formula RYH$^+$Z$^-$, comprising a RYH$^+$ ion and a counterion Z$^-$. Examples of organic salts comprise for example ammonium salts, for example primary, secondary or tertiary ammonium salts.

Primary ammonium salts comprise a primary ammonium ion having one organic group R$^1$, secondary ammonium salts comprise a secondary ammonium ion having two organic groups R$^1$ and R$^2$ and tertiary ammonium salts comprising a tertiary ammonium ion having three organic groups R$^1$, R$^2$ and R$^3$. In case an ammonium salt/ion comprises more than one organic groups, the organic groups can be chosen independently from each other. The organic groups can be the same or can be different. Some preferred R-groups, for example R$^1$-, R$^2$- or R$^3$-groups are mentioned below.

RY refers to the deprotonated form of the RYH$^+$ ion of the organic salt of formula RYH$^+$Z$^-$ and may refer to RNH$_2$, R$^1$R$^2$NH or R$^1$R$^2$R$^3$H. Some preferred R-groups, for example R$^1$-, R$^2$- or R$^3$-groups are mentioned below.

The counterion Z$^-$ comprises preferably a halide, for example a fluoride, chloride, bromide or iodide.

Preferred examples of primary ammonium salts comprise butylammonium chloride, butylammonium bromide, triethylammonium chloride, oleylammonium chloride.

As R-group of the additional compound of formula RYH or of the compound of formula RYH$^+$Z$^-$ any type of organic group can be considered. The R-group comprises at least one carbon atom. The number of carbon atoms of the R-group can be chosen in function of the final application. In principle the number of carbon atoms is not limited. Preferred R-groups comprise between 1 and 20 carbon atoms, for example between 1 and 10 carbon atoms, for example 2, 3, 4 or 5 carbon atoms. An R-group may be polar or apolar.

Some examples of apolar R-groups comprise oleyl-; myristyl-, dodecyl-groups and branched alkanes as for example 2-propylhexane. It is clear that the R-groups may comprise one or more double bonds (as for example in case the R-group comprises oleyl-).

Some preferred examples of polar R-groups comprise short carbon skeletons (for example having between 1 and 10 carbon atoms, for example 2, 3, 4 or 5 carbon atoms) comprising at least one of the following functional groups: $-NH_2$, $-OH$, $-O-$, $-SH$. More particularly R-groups comprise -propylalcohol, -propylamine, -propanethiol, -diethyleneglycol and -thioglycol.

It is clear that the solvent may comprise more than one additional compound of formula RYH and/or of formula $RYH^+Z^-$. The solvent may comprise more than one additional compound of formula RYH, more than one additional compound of formula $RYH^+Z^-$ or a combination of one or more additional compounds of formula RYH and one or more additional compounds of formula $RYH^+Z^-$.

The solvent used in the method of the present invention may comprise a polar solvent or an apolar solvent. The polarity of the solvent can be chosen in function of the polarity of the final ligands, i.e. the polarity of the ligands present at the outer surface of the quantum dots after the dispersion step.

Apolar solvents are preferred in case the ligands $RY^-$ or RY that are introduced and bound to the surface of the quantum dots after exchange comprise an aliphatic R-group without any polar functional group and preferably have at least 8 or 9 carbon atoms. Such R-groups may comprise one or more double bonds.

Apolar solvents comprise for examples alkanes, such as pentane, hexane, cyclohexane. Other examples comprise benzene, toluene and halogenated solvents such as chloroform, tetrachloroethylene and carbon tetrachloride.

Polar solvents are preferred in case the ligands $RY^-$ or RY that are introduced and bound to the surface of the quantum dots after exchange comprise R-groups with one or more polar functional groups and preferably have maximum 8 carbon atoms, for example maximum 4 carbon atoms.

Examples of polar solvents comprise N,N-dimethylformamide (DMF), acetonitrile, dimethylsulfoxide (DMSO), water, and amines, preferably short amines such as n-butylamine, pentylamine or ethanolamine. Alcohols such as methanol, ethanol, propanol and butanol can be considered as polar solvent although it might be difficult to disperse quantum dots (even with polar short ligands on their surface) in alcohols.

The term "quantum dot" (QD) or "semiconductor nanocrystal" refers to nanometer-sized crystallites of a semiconductor that can exhibit size-dependent optical and electronic properties. Nanometer-sized particles include all types of particles having at least one of their dimensions, for example diameter, length, width or thickness in the nanometer scale and include crystalline or amorphous nanoparticles, nanocrystals, quantum dots, quantum rods, tetrapods, nanotubes, nanospheres, nanodisc, etc. Nanometer-sized particles are not limited to any particular shape, and may include spherical as well as non-spherical particles.

Quantum dots may have a homogeneous or substantially homogenous composition or may have a heterogeneous composition. Quantum dots comprising a homogenous composition for example consist of a core. Quantum dots comprising a heterogeneous composition have for example a composition gradient along a line from the quantum dot centre to the quantum dot surface or comprise core/shell quantum dots.

The material of the quantum dots comprises for example a group III-V material, for example a binary, ternary or quaternary group III-V material for example comprising Ga and/or In as group III element and comprising N, P, As and/or Sb as group V element. Preferred core materials comprise InP, InAs, InSb, GaP, GaAs, GaSb, In(As, P), In(As, Sb), (In(P, Sb), (In, Ga)P, (In, Ga)As and (In, Ga)Sb. Furthermore, the core may comprise alloyed group II/group III materials in combination with group V pnictides, as for example (In, Zn)P.

The method according to the present invention is in particular suitable to modify the surface terminations of quantum dots comprising III-V material as for example quantum dots comprising InP, InAs, InSb, GaP, GaAs, GaSb, In(As, P), In(As, Sb), In(P, Sb), (In, Ga)P, (In, Ga)As and (In, Ga)Sb.

In case the additional compound comprises an organic acid of formula RYH, the acidic proton $H^+$ of the compound of formula RYH protonates the L type ligands (or at least part of the L type ligands). The protonated L type ligands are thereby preferably removed (desorbed) from the surface of the quantum dots. Additionally, preferably simultaneously, the X type ligands (or at least part of the X type ligands) are removed from the surface of the quantum dots and are replaced by the deprotonated acid (conjugated base) $RY^-$ of the compound of formula RYH. The incoming $RY^-$ ligand may passivate the surface of the quantum dot.

Consequently, the method according to the present invention allows to displace simultaneously (or almost simultaneously) the X type ligands (or at least part of the X type ligands) and the L type ligands (or at least part of the L type ligands). More particularly, the acidic proton $H^+$ of the additional compound of formula RYH protonates the L type ligands (or at least part of the L type ligands) thereby removing the L type ligands and RY of the additional compound of formula RYH displaces the X type ligands (or at least part of the X type ligands). The X type ligands and the L type ligands are preferably displaced simultaneously. The X type ligands (or at least part of the X type ligands) are replaced by $RY^-$ ligands of the compound of formula RYH, thereby passivating the surface of the modified quantum dots.

Preferably, a salt of the protonated L type ligand and of the X type ligand is formed during the dispersion step.

In case the additional compound comprises an organic salt of formula $RYH^+Z^-$, the acidic proton $H^+$ of the compound of formula $RYH^+Z^-$ protonates the L type ligands (or at least part of the L type ligands). Additionally, preferably simultaneously, the X type ligands (or at least part of the X type ligands) are removed from the surface of the quantum dots and are replaced by the counterion $Z^-$ of the organic salt of formula $RYH^+Z^-$ and/or by the deprotonated acid (conjugated base) RY of ion $RYH^+$ of the organic salt of formula $RYH^+Z^-$. The incoming $Z^-$ ligands and/or the incoming RY ligands may passivate the surface of the quantum dot.

Consequently, the method according to the present invention allows to displace simultaneously (or almost simultaneously) the X type ligands (or at least part of the X type ligands) and the L type ligands (or at least part of the L type ligands). More particularly, the acidic proton $H^+$ of the additional compound of formula $RYH^+Z^-$ protonates the L type ligands (or at least part of the L type ligands) thereby removing the L type ligands and the counterion $Z^-$ and/or RY ligands of the compound of formula $RYH^+Z^-$ displaces the X type ligands (or at least part of the X type ligands). Preferably the counterion $Z^-$ of the compound of formula $RYH^+Z^-$ displaces the X type ligands (or at least part of the X type ligands). In such case RY may bind to the surface of the quantum dots as a L type ligand.

The X type ligands and the protonated L type ligands are preferably displaced simultaneously. The X type ligands (or at least part of the X type ligands) are replaced by $Z^-$ ligands and/or RY ligands of the compound of formula $RYH^+Z^-$, thereby passivating the surface of the modified quantum dots.

Preferably, a salt of the protonated L type ligand and of the X type ligand is formed during the dispersion step.

In case a dispersion comprising quantum dots with a hybrid surface termination having amine and chloride ligands is used, by adding additional compound of formula RYH or of formula $RYH^+Z^-$ having an acidic proton $H^+$ (for example organic thiols, primary fatty acid or primary alkylammoniums) to the dispersion comprising the quantum dots, amine ligands and chloride ligands are displaced and can form an ammonium salt (ammonium chloride) and the conjugated base $RY^-$ or the $Z^-$ counterion and/or RY ligands may passivate the surface.

The method according to the present invention may further comprise the step of

> separating the modified quantum dots, in particular separating the modified quantum dots from the solvent and/or from the salt.

In principle any technique known in the art to separate the modified quantum dots from the solvent and/or from the salt can be used. Preferred techniques comprise precipitation and centrifugation. Other techniques such as electrophoresis or column chromatography can be considered as well.

A preferred technique to separate the modified quantum dots is precipitation of the modified quantum dots by adding a second solvent that is miscible with the first solvent (=the solvent in which the quantum dot dispersion is provided), but has a different polarity than the first solvent. In case the quantum dots are provided as a dispersion in an apolar solvent, a more polar solvent, miscible with the apolar solvent, is preferably used.

The quantum dots are for example provided as a dispersion in an apolar solvent, for example hexane or octane and the modified quantum dots are separated by precipitating the modified quantum dots in a more polar solvent, for example ethanol, acetonitrile, isopropanol, methylacetate or acetone.

According to a second aspect surface modified quantum dots obtainable by the method described above are provided. The quantum dots are passivated by polar or apolar $RY^-$ ligands or by polar or apolar $Z^-$ ligands and/or RY ligands.

Apolar $RY^-$ ligands are for example selected from the group consisting of thiolates, preferably alkane thiolates and carboxylates, preferably alkane carboxylates. Alkane thiolates comprise for example octanethiolate, dodecanthiolate or hexadecanethiolate. Alkanecarboxylates comprise for example myristate, oleate and decanoate. The alkane of the thiolates or carboxylate can be branched (as for example 2-propylhexanoate) or unbranched.

Polar $RY^-$ ligands are for example selected from the group consisting of 3-mercaptopropionate, ethanedithiolate and thioglycolate.

The group $Y^-$ comprises preferably a thiolate, a carboxylate or an alkoxide and the group R— comprises preferably from 1 to 20 carbon atoms and optionally further comprising one or more functional group as for example a —OH group, —SH group and/or —NH group.

The quantum dots may comprise a homogeneous composition or heterogeneous composition. Quantum dots comprising a homogenous composition for example consist of a core. Quantum dots comprising a heterogeneous composition have for example a composition gradient along a line from the quantum dot centre to the quantum dot surface or comprise core/shell quantum dots.

The material of the quantum dots comprises for example a group III-V material, for example a binary, ternary or quaternary group III-V material for example comprising Ga and/or In as group III element and comprising N, P, As and/or Sb as group V element. Preferred materials comprise InP, InAs, InSb, GaP, GaAs, GaSb, In(As, P), In(As, Sb), In(P, Sb), (In, Ga)P, (In, Ga)As or (In, Ga)Sb.

According to a third aspect of the present invention a method to prepare a dispersion comprising surface modified quantum dots is provided. The method comprises the steps of > providing a first solution comprising quantum dots in a first solvent, the first solvent is an apolar solvent, the quantum dots are provided with X type ligands and L type ligands at their outer surface, with X type ligands being ligands able to donate one electron to the quantum dot to which the X type ligand is bound and with L type ligands being ligands able to donate two electrons to the quantum dot to which the L type ligand is bound;
>
> providing a second solution comprising a second solvent, an additional compound and optionally at least one stabilizing agent, the second solvent is a polar solvent, the additional compound comprises an organic acid of formula RYH or an organic salt of formula $RYH^+Z$. The additional compound has at least one acidic proton $H^+$ having a pKa in water equal or lower than 16 and comprising an R-group comprising at least one carbon atom. The organic acid of formula RYH is preferably selected from the group consisting of carboxylic acids, sulfonic acids, thiols and phenols. The organic salt of formula $RYH^+Z^-$ comprises an organic ammonium ion $RYH^+$ and a negatively charged counterion $Z^-$. The organic ammonium ion $RYH^+$ comprises for example a primary, secondary or tertiary ammonium ion. The negatively charged counterion $Z^-$ of the organic salt of formula $RYH^+Z^-$ comprises preferably a halide, for example a fluoride, chloride, bromide or iodide. $RY^-$ of the organic acid of formula RYH or RY of the organic salt of formula $RYH^+Z$ are polar. The first solvent and the second solvent are immiscible with each other;
>
> mixing the first solution and the second solution to provide surface modified quantum dots, the modified quantum dots are provided with $RY^-$ ligands of the organic acid of formula RYH or with $Z^-$ counterion ligands of the organic salt of formula $RYH^+Z^-$ and/or with RY ligands of the organic salt of formula $RYH^+Z^-$ (i.e. with deprotonated conjugated base of ion $RYH^+$ of the organic salt of formula $RYH^+Z^-$), and to extract said surface modified quantum dots from the first solvent of the first solution into the second solvent;
>
> removing the first solvent.

According to the method to prepare a dispersion according to the present invention, by mixing the first and the second solution, at least part of the X type ligands and at least part of the L type ligands are displaced from the surface of the quantum dots. The acidic proton $H^+$ of the compound of formula RYH or of the compound of formula $RYH^+Z$ protonates at least part of the L type ligands, for example all of the L type ligands. The protonated L type ligands are preferably removed (desorbed) from the surface of the quantum dots. Simultaneously (or almost simultaneously, at least part of the X type ligands, preferably all of the X type ligands are removed from the surface of the quantum dots and replaced by the $RY^-$ ligands of the organic acid of formula RYH or by the counterion $Z^-$ of the organic salt of formula $RYH^+Z^-$ and/or by the deprotonated conjugated base (RY ligands) of ion $RYH^+$ of the organic salt of formula $RYH^+Z^-$ to provide surface modified quantum dots. As the $RY^-$ ligands or RY ligands are polar ligands, the surface modified quantum dots will be extracted to the second solvent, the polar solvent.

Preferably, the R-group of the additional compound comprises at least one additional functional group capable of participating in hydrogen bonding. Examples of such additional functional groups comprise a —OH functional groups, a —SH functional group or a —NH functional group. It is clear that the compound of formula RYH may comprise more than one additional functional group.

Preferably, the R-group of compound of formula RYH has a relative short organic group, preferably comprising from 1 to 20 carbon atoms, for example from 1 to 10 carbon atoms, such as 2, 3, 4 or 5 carbon atoms.

Most preferably, the compound of formula RYH comprises an R-group having at least one additional functional group capable of participating in hydrogen bonding and having between 1 to 20 carbons, for example from 1 to 10 carbon atoms.

Preferred compounds of formula RYH comprise ethane dithiol, mercaptopropionic acid, thioglycerol, thioglycolic acid, glycolic acid and succinic acid.

Preferably, the second solution comprises a stabilizing agent. The stabilizing agent preferably comprises an amine, for example a monofunctional, bifunctional or multifunctional amine, preferably having a short chain of carbon atoms (for example a chain having between 1 and 5 carbon atoms, such as 2, 3 or 4 carbon atoms).

Preferred examples of stabilizing agents comprise butyl amine, ethylene diamine and ethanolamine. Other examples comprise triethylamine and pyridine.

The stabilizing agent allows to exchange remaining X type and or L type ligands on the surface of the modified quantum dots. Furthermore a stabilizing agent may function as a base to form salts.

As mentioned above, the first and second solvent are preferably immiscible. Preferred examples of first and second solvents that are immiscible comprise alkanes, such as hexane, heptane or octane as first solvent and N,N'-dimethylformamide (DMF), formamide or dimethylsulfoxide (DMSO) as second solvent.

The method to prepare the dispersion of quantum dots according to the present invention may further comprise the redispersion of the quantum dots in another solvent. The modified quantum dots in the polar solvent may be precipitated for example by adding an apolar solvent to the polar solvent comprising the modified quantum dots. The precipitated quantum dots can then be redispersed in a solvent of choice. The solvent can for example be chosen in function of the deposition technique to deposit the quantum dots and/or in function of the application of the layer of quantum dots.

According to a fourth aspect of the present invention a dispersion comprising quantum dots is provided. The dispersion comprises modified quantum dots as described above. The dispersion may comprise a dispersion obtainable by the above described method to prepare a dispersion of quantum dots.

Such dispersion is for example suitable to be deposited to form a thin film of quantum dots. As described above, the ligands of the quantum dots can be chosen to optimize the properties of the thin film. The ligands can for example be short or long, polar or apolar. The ligands can be chosen in function of the desired properties of the thin film of quantum dots. By providing the quantum dots with short ligands (having a number of carbon atoms lower than 10, for example 2, 3 4 or 5 carbon atoms), a densely packed film comprising quantum dots can be obtained. Furthermore the ligands can be chosen to obtain an electronically conductive layer.

To form a film, a dispersion according to the present invention can be deposited by any technique known in the art. Preferred coating techniques to deposit the dispersion to form a film comprise spin coating, doctor blading and dipcoating.

A dispersion comprising modified quantum dots according to the present invention is in particular suitable as ink. The ink can be deposited to form a thin film comprising quantum dots, for example by spin-coating, doctor blading or dipcoating.

According to a further aspect of the present invention a layer or film comprising quantum dots obtainable from a dispersion as described above is provided. The choice of the ligands of the modified quantum dots may influence the properties of the layer or film.

In preferred embodiments the quantum dots have short ligands (having a number of carbon atoms lower than 10, for example 2, 3 4 or 5 carbon atoms) to form a layer of densely packed quantum dots having good electronic conductivity. The layer or film is for example embedded between charge transport layers and/or electrodes.

According to still a further aspect a device comprising a layer or film of quantum dots as described above is provided. Preferred devices comprise photodiodes, phototransistors, photoconductors or solar cells. The device comprises for example a layer or film of quantum dots as described above embedded between charge transport layers and/or electrodes.

BRIEF DESCRIPTION OF THE DRAWINGS

The present invention will be discussed in more detail below, with reference to the attached drawings, in which.

DESCRIPTION OF EMBODIMENTS

Figure 1:
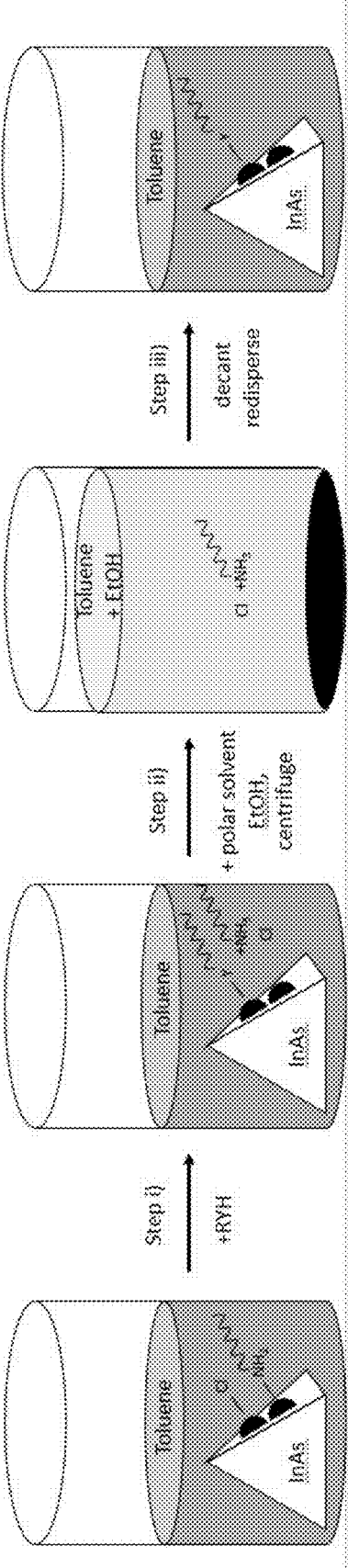
FIG. 1 is a schematic illustration of the ligand exchange and removal of X type ligands and L type ligands from the surface of quantum dots to prepare modified quantum dots according to the present invention.

The present invention will be described with respect to particular embodiments and with reference to certain drawings but the invention is not limited thereto but only by the claims. The drawings are only schematic and are non-limiting. The size of some of the elements in the drawing may be exaggerated and not drawn on scale for illustrative purposes. The dimensions and the relative dimensions do not correspond to actual reductions to practice of the invention.

When referring to the endpoints of a range, the endpoints values of the range are included.

When describing the invention, the terms used are construed in accordance with the following definitions, unless indicated otherwise.

The term 'and/or' when listing two or more items, means that any one of the listed items can by employed by itself or that any combination of two or more of the listed items can be employed.

The term "ligand" refers to any molecule or ion capable of interacting, either weakly or strongly, with a quantum dot for example through covalent interaction, ionic interaction, Van der Waals interaction or by any other molecule interaction with the outer surface of the quantum dot. The term ligands include L type ligands as well as X type ligands.

The term "surface termination" refers to the ligands present at the surface of a quantum dot and include all types of ligands as for example L type ligands and X type ligands.

The term "modified quantum dots" or "surface modified quantum dots" refers to quantum dots provided with the exchanged ligands. For the purpose of this invention, the terms modified quantum dots and surface modified quantum dots are interchangeable.

"2D-NOESY" refers to 2D Nuclear Overhauser Effect Spectroscopy. "2D-DOSY" or "2D-DOSY NMR" refers to 2D Diffusion Ordered Spectroscopy. In 2D NOESY spectra, the presence of so-called negative nuclear overhauser effect (nOe) cross peaks indicates interaction of a compound with the quantum dot surface. A 2D-DOSY NMR spectrum of a dispersion of quantum dots yields the diffusion coefficient of quantum dots. For tightly bound ligands, this diffusion coefficient matches the diffusion coefficient of a single quantum dot—the ligand diffuses together with the quantum dot—while dynamic ligands exhibit a diffusion coefficient that is the population average of the diffusion coefficient of the ligand in the bound and free state.

"XPS" refers to X-ray Photoelectron Spectroscopy.

"RBS" refers to Rutherford Backscattering Spectroscopy.

FIG. 1 shows the different steps of the ligand exchange and removal of X type ligands and L type ligands from the surface of quantum dots according to the present invention to prepare modified quantum dots. Tetrahedral shaped InAs quantum dots are dispersed in toluene. The In-rich (indicated with blobs in FIG. 1) quantum dots are provided with chloride ligands (X type ligands) and oleylamine ligands (L type ligands). Upon adding compound of formula RYH (for example a carboxylic acid, a thiol or water), an acid-base reaction ensues after which the oleylamine ligands and the chloride ligands are displaced, an alkylammonium chloride salt desorbs and the incoming $RY^-$ ligands coordinate the surface of the quantum dots (step i)). The thus obtained quantum dots provided with the $RY^-$ ligands are referred to as the surface modified quantum dots. The properties of such surface modified quantum dots depend amongst others upon the length and the polarity of the $RY^-$ ligands. Consequently, the properties of the surface modified quantum dots can be influenced by the choice of the $RY^-$ ligands.

To fully displace the salt from the surface, the method may comprise the additional step of making the solution more polar, for example by adding a polar solvent such as ethanol (EtOH), to precipitate the surface modified quantum dots (step ii)).

Subsequently, the supernatant comprising the formed salt is discarded and the surface modified quantum dots are redispersed in an apolar solvent, for example in toluene (step iii)).

Figure 2:
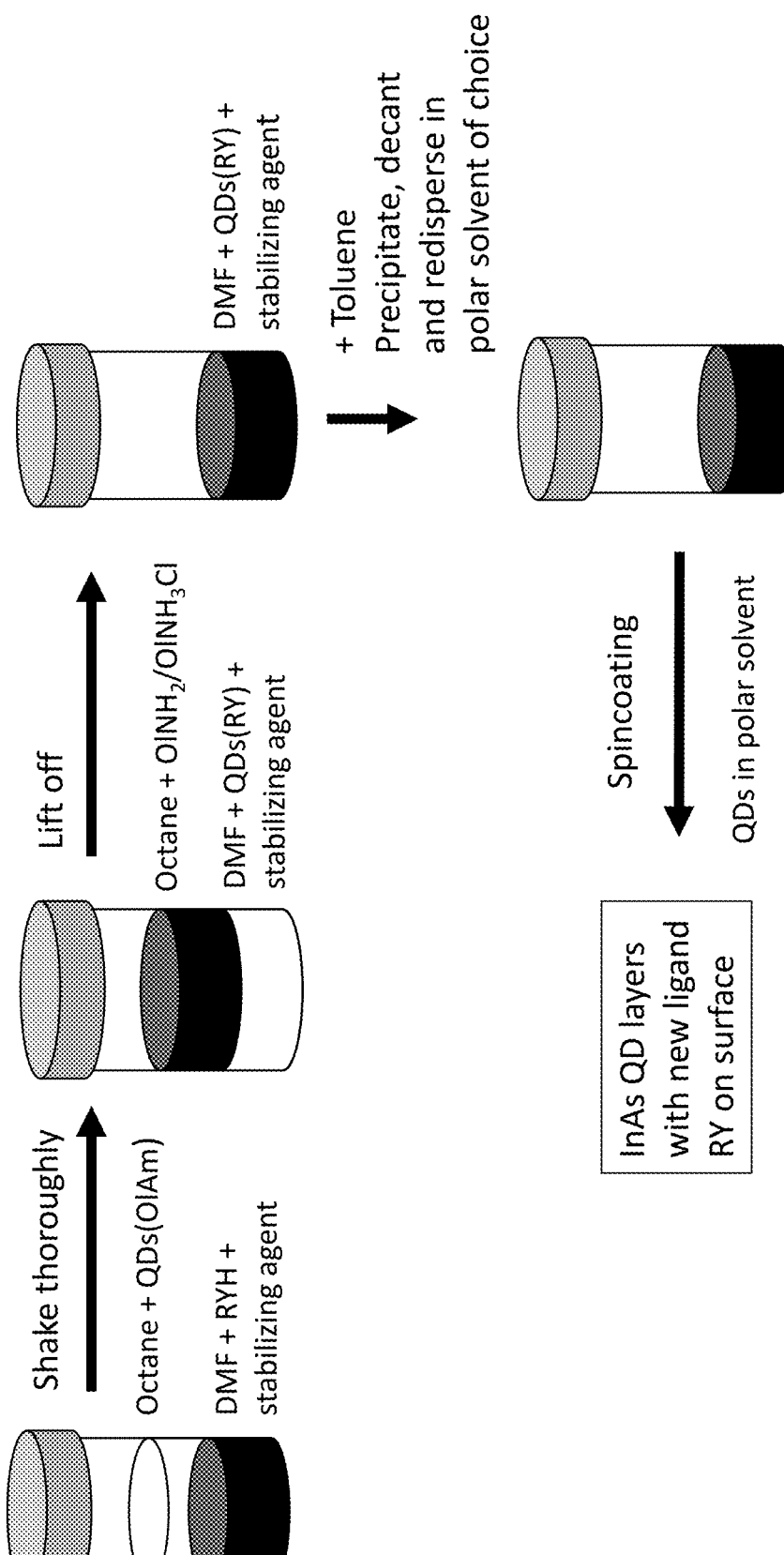
FIG. 2 is a schematic illustration of the preparation of a dispersion using an extraction process according to the present invention.

FIG. 2 shows the different steps to prepare a dispersion comprising quantum dots according to the present invention. The method uses an extraction process. InAs quantum dots provided with chloride ligands (X type ligands) and oleylamine (OlAm) ligands (L type ligands) are dispersed in an apolar solvent, for example in an alkane such as octane, to form a first solution.

A second solution comprising a compound of formula RYH in an polar solvent, for example N,N-dimethylformamide (DMF), is prepared. The compound of formula RYH has an acidic proton. The RY-group of the compound of formula RYH further comprises a functional group capable of participating in hydrogen bonding, for example a —OH, —SH or —NH group. The RY-group comprises preferably and/or said R-group comprises from 1 to 20 carbon atoms. The compound of formula RYH comprises for example 1,2-ethanedithiol, 3-mercaptopropionic acid or thioglycerol.

Preferably, the second solution further comprises a stabilizing agent, for example a mono- or bifunctional amine, such as butyl amine, ethylene diamine and ethanolamine.

The first solution is placed on top of the second solution, forming a biphasic system. The first and second solution are shaked thoroughly. Ligand exchange occurs at the interphase of the first and second solution and the surface of the InAs quantum dots becomes decorated by the 2 ligands added to the second solution.

The small polar ligands $RY^-$ that are now present on the surface of the quantum dots render the InAs quantum dots dispersible in the polar solvent (DMF) and the quantum dots extracted from the apolar phase (alkane) to the polar phase (DMF).

After discarding the alkane phase modified quantum dots with the polar ligands in the polar solvent (DMF) are left. This dispersion is for example suitable as ink. The dispersion can be deposited to form a layer of quantum dots, for example by spin-coating and results in a uniform layer of InAs quantum dots having short organic ligands.

It is clear that the modified quantum dots can be redispersed in another solvent. Therefore the quantum dots in the polar solvent can be precipitated for example by adding an apolar solvent such as toluene. Subsequently, the precipitated quantum dots can be redispersed in a solvent of choice depending on the deposition technique to deposit a layer of quantum dots or depending on the application of the layer of quantum dots. The dispersion comprising quantum dots is for example deposited by means of spincoating to form a layer of InAs quantum dots with new ligands $RY^-$ on the surface of the quantum dots.

Figure 3:
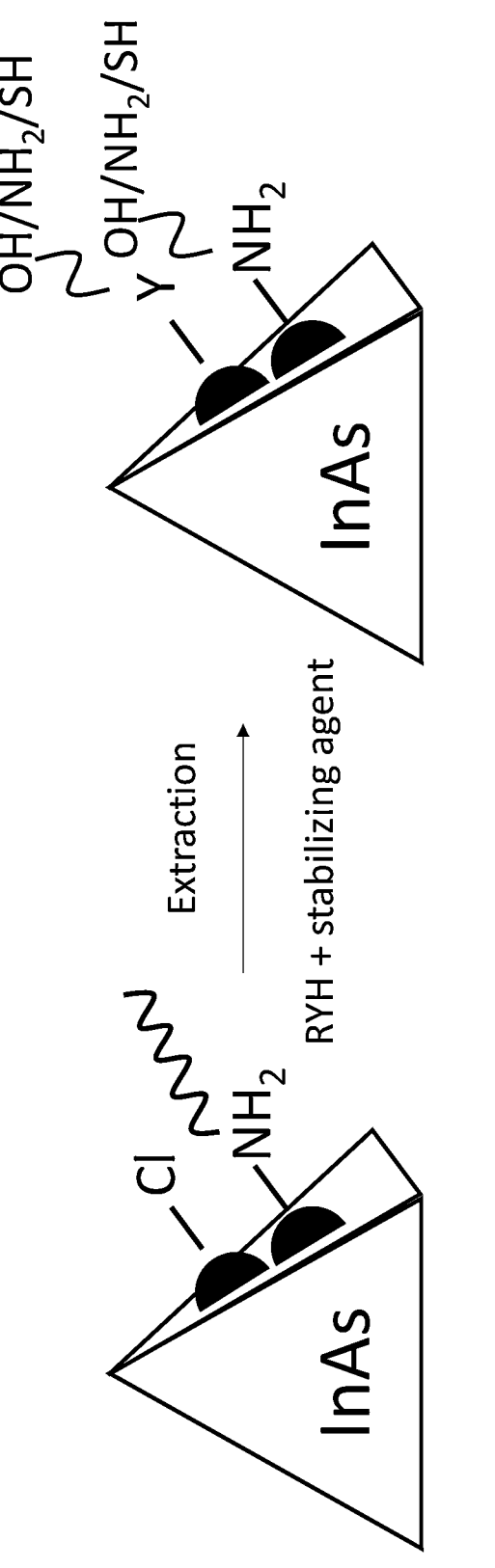
FIG. 3 is a schematic illustration of the ligand exchange reaction that ensues during the extraction of quantum dots from an apolar phase to a polar phase according to a method according to the present invention.

FIG. 3 is a schematic illustration of the ligand exchange reaction that ensues during the extraction of the InAs quantum dots from an apolar solvent (for example an alkane such as hexane) to a polar phase (for example DMF). The bifunctional, polar nature of the ligands in DMF renders the underlying quantum dots soluble in polar solvents.

Example: Synthesis and Characterization of InAs Quantum Dots

Materials

Toluene (anh. 99.8%) and ethanol (anh.) were purchased from VWR and purified via the freeze-pump-thaw method before bringing into a $N_2$ glovebox.

Oleylamine (OlAm) (>96% prim. amine, 80-90% C18 content) was purchased from Acros Organics, dried over $CaH_2$ and consequently vacuum distilled.

Tris(diethylamino)phosphine (97%), 10-undecenoic acid (98%) were purchased from Sigma-Aldrich.

Tris-dimethylaminoarsine (99%) was ordered from Strem chemicals.

Toluene-d8 was purchased from Eurisotop.

Synthesis and Characterization

In(As, P) quantum dots were synthesized via a wet chemical route. In a 25 mL three-neck flask, $InCl_3$ and OlAm are degassed and consequently heated to the reaction temperature. Tris(dimethylamino)arsine is injected at a 1:1 ratio to In, after which Tris(diethylamino)phosphine (TDEAP) is injected in a 3:1:1 ratio to reduce the arsine and produce In(As, P) quantum dots. The dual reactivity of TDEAP leads to some P alloying. All steps of the synthesis including reaction, purification and characterisation were performed under nitrogen atmosphere to avoid oxidation.

Transmission electron micrographs confirmed that the synthesized quantum dots have a tetrahedral shape.

Figure 4:
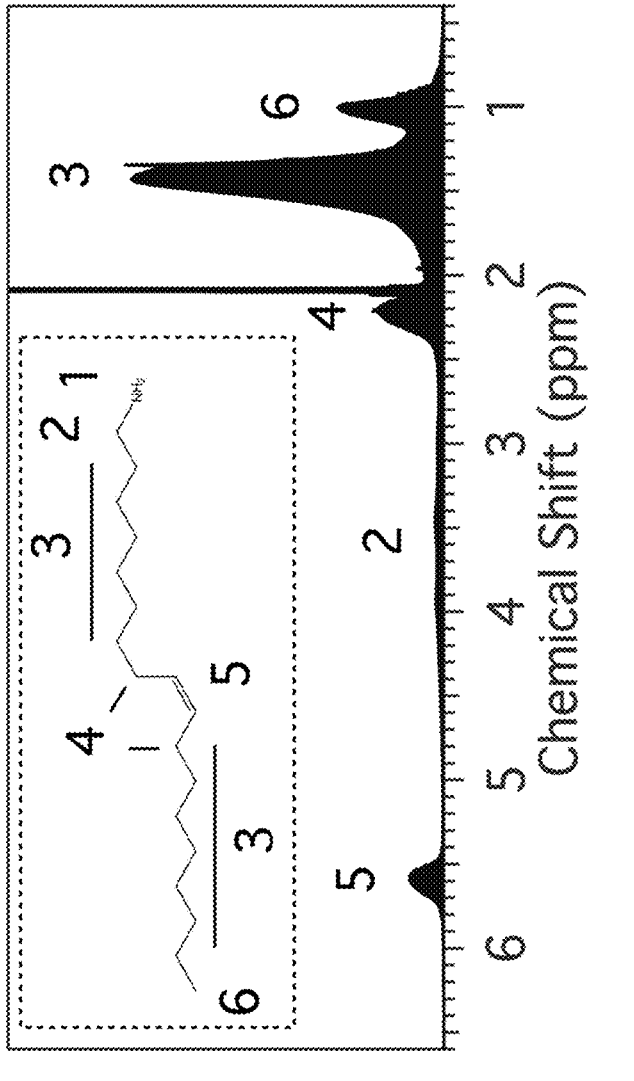
FIG. 4 shows the 1D H-NMR spectrum of purified In(As, P) quantum dots in toluene-d8 stabilized by an oleylamine ligand shell.

H-NMR spectroscopy was used to characterize the ligands stabilizing the InAs quantum dots. FIG. 4 shows the 1D $^1$H-NMR spectrum of purified InAs quantum dots in toluene-d8 with the resonances annotated according to the OlAm molecule in the inset of FIG. 4.

Figure 5:
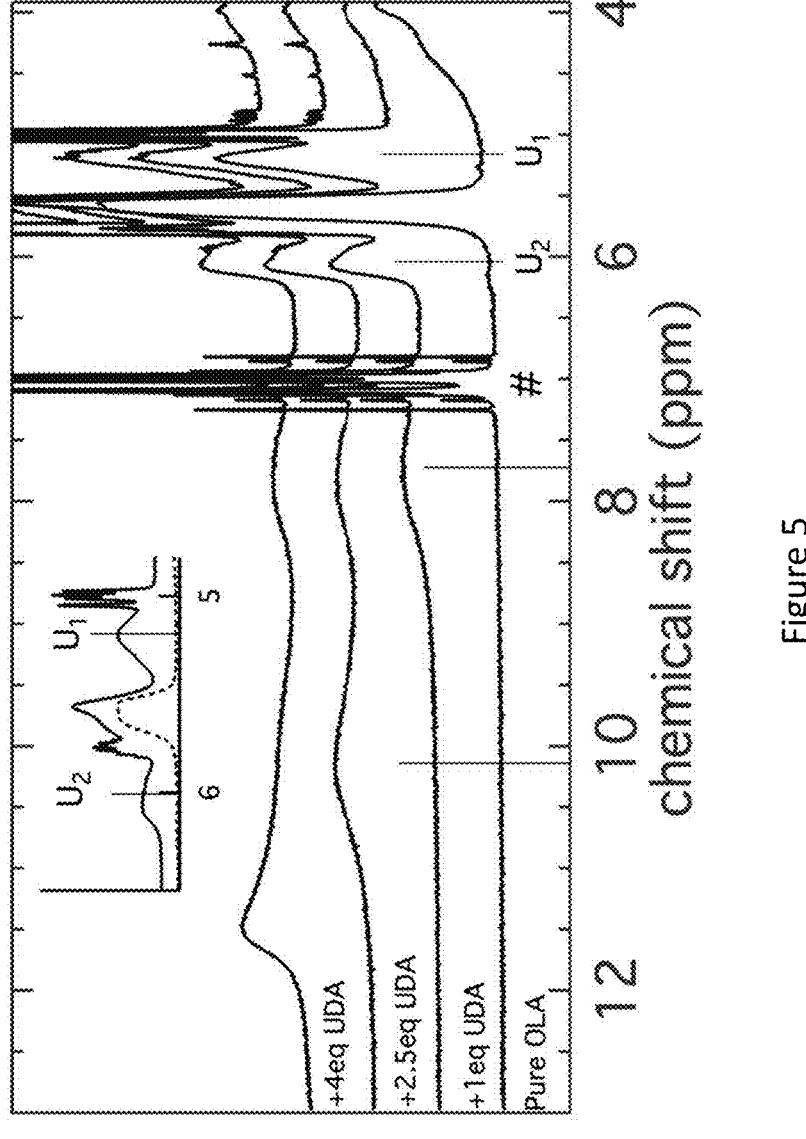
FIG. 5 shows the H-NMR spectra during the progressive addition of 1, 2.5 and 4 equivalents of UDA to a solution of OlAm-capped In(As, P) quantum dots.

$^1$H-NMR was also used to probe ligand exchange reactions between organic ligands. The ligand exchange of OlAm with Undec-10-enoic acid (UDA) was probed by stepwise additions of excess UDA. The terminal unsaturation allows for easy identification in $^1$H-NMR. In FIG. 5 the $^1$H-NMR spectra are shown during the progressive addition of 1, 2.5 and 4 equivalents of UDA to a solution of OlAm-capped InAs quantum dots. Besides the alkene resonance 5 from OlAm in the initial trace and the residual toluene around 7 ppm, addition of 1 equivalent of UDA yields 3 extra peaks. One at 5.20, at 6.05 and 7.75 ppm, corresponding to the terminal olefinic $CH_2$ $U_1$ and CH $U_2$ in UDA, as well as a protonated oleylammonium species $OlNH^+_3$ respectively.

Notably, the olefinic resonances of UDA contain both a very broad and sharp contribution already at 1 equivalent added. The broad resonances for the protons U1 and U2 indicate the surface ligation of the UDA molecule to the quantum dots, whereas simultaneously an $OlNH_3^+$ salt is formed. Further addition of carboxylic acid does not induce visible changes in the $OlNH^+_3$ peak at 7.75 ppm, but rather yields another peak first at 10.2 ppm which evolves to 11.5 ppm after 4 equivalents of UDA. Broad peaks above 10 ppm are typical of carboxylic acids.

Figure 6:
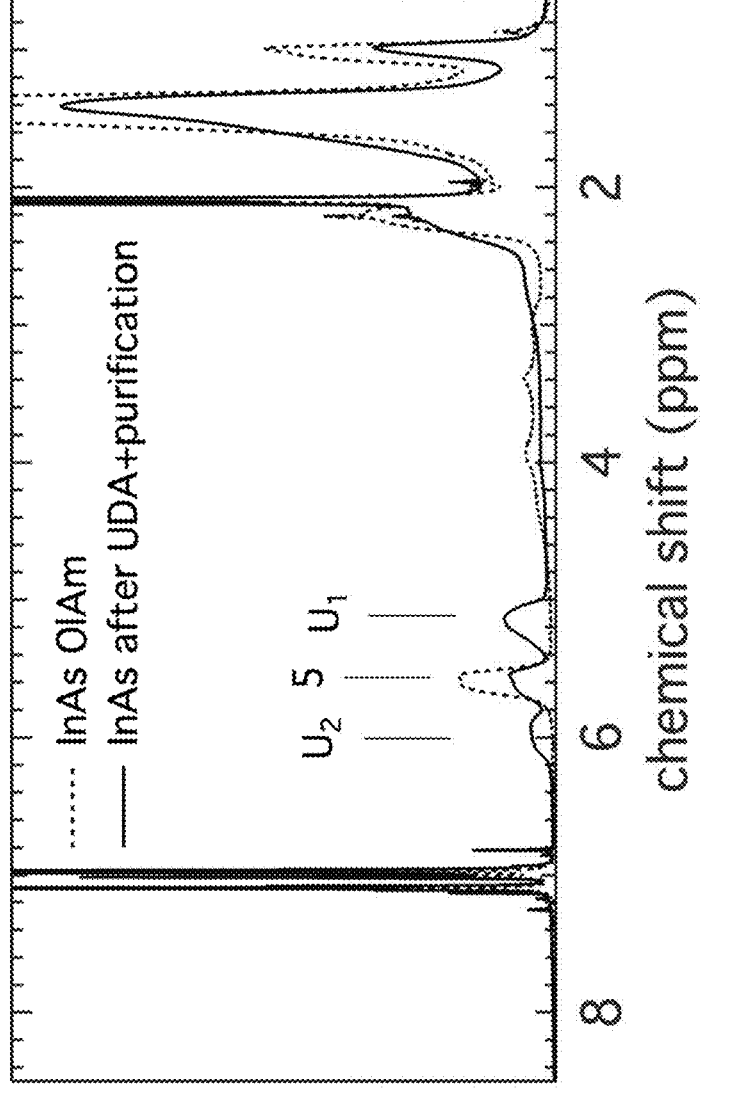
FIG. 6 shows the overlaid H-NMR spectra of the purified InAs quantum dots and the InAs quantum dots after UDA addition and 1 cycle of precipitation/redispersion.

$^1$H-NMR was also used to characterize the exchanged and purified InAs quantum dots in FIG. 6. The formed $OlNH_3^+$ salt at 7.75 ppm is removed during a cycle of precipitation/ redispersion as can be noted by its absence in FIG. 6. The broad resonances for U1 and U2 of the UDA molecule persist throughout purification, indicating ligation of UDA to the quantum dots. The reduced intensity of the OlAm signal 5 represents the fraction of the OlAm that is removed during the ligand exchange in the form of a salt.

Figure 7:
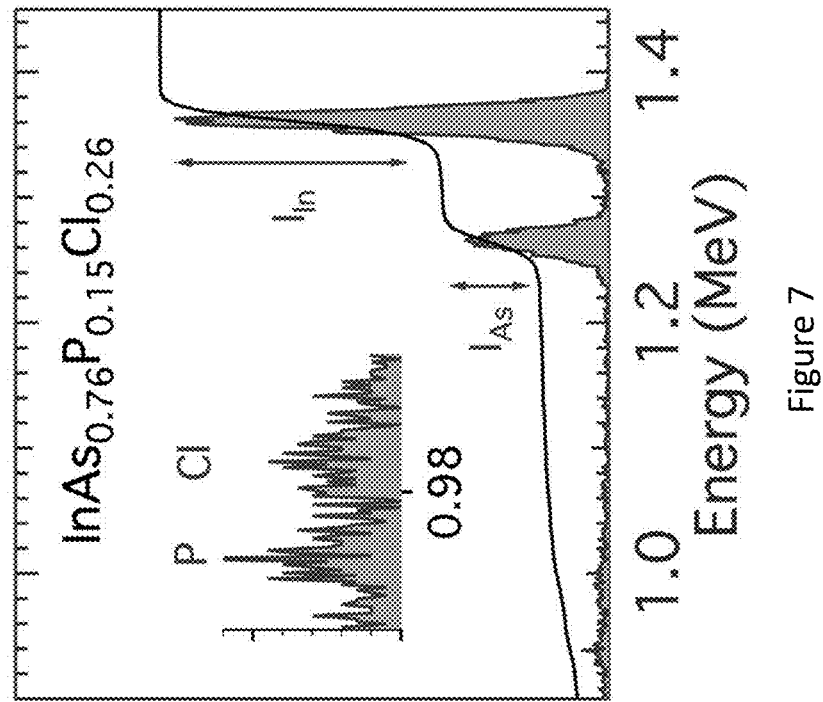
FIG. 7 shows a quantitative Rutherford backscattering spectrometry spectrum for In(As, P) quantum dots.

To identify the presence of chloride surface ligands (X type ligands), techniques complementary to the $^1$H-NMR analysis are required. FIG. 7 shows the Rutherford backscattering spectrometry spectrum of the above described In(As, P) quantum dots. Rutherford backscattering spectroscopy is a quantitative technique allowing to determine the composition. According to the Rutherford backscattering spectrometry technique, the composition was determined to be equal to $InAs_{0.76}P_{0.15}Cl_{0.26}$, proving that the quantum dots are In-rich and accumulate a large chloride content. Together with the $^1$H-NMR data presented (see above), it can be concluded that the surface termination of the quantum dots comprise L type ligands (OlAm) and X type ligands (Cl-ions).

Figure 8:
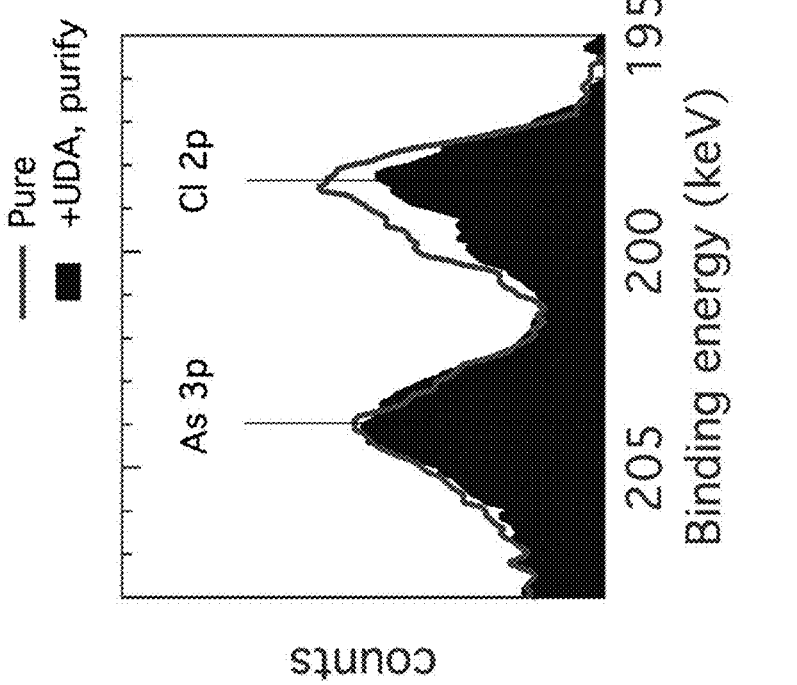
FIG. 8 shows the overlaid x-ray photoelectron spectroscopy spectra before and after the addition of UDA and consequent purification of the quantum dots.

In order to confirm that the identified X-type ligands are on the surface and are displaced in parallel with the L-type OlAm, x-ray photoelectron spectroscopy (XPS) was used to monitor the relative Cl content before and after the UDA titration. In FIG. 8 the region of the XPS-spectrum around 200 keV is presented and shows a clear drop in the Cl/As ratio, which arises from the loss of Cl-ions in the form of $OlNH_3Cl$. The relative reduction in the OlAm resonance from H-NMR and the drop in the Cl-peak in XPS allows for an estimation of the initial Cl:OlAm content on the quantum dot, which in this case yields 1.45:1.

In a second experiment the same quantum dots as described above, i.e. In(As, P) quantum dots with oleylamine and chloride ligands, are titrated by up to 30 equivalents of hexadecanethiol (HdSH). The $^1$H-NMR spectrum before addition of HdSH shows the characteristic resonances of oleylamine tightly bound to In(As, P).

After addition of the first equivalents of HdSH, the presence of ammonium protons is identified in the $^1$H-NMR, demonstrating that HdSH protonates surface bound oleylamine. After addition of 30 equivalents of HdSH, the quantum dots are purified by precipitation with EtOH and redispersion in toluene-$d_8$.

From the quantitative $^1$H-NMR spectra of the discarded supernatant and the redispersed quantum dots one can conclude that oleylamine has been removed from the surface as an oleylammonium salt, whereas the total ligand density has remained constant, suggesting the binding of titrated HdSH as the conjugate base $HdS^-$.

Analysis of the supernatant with a spectrophotometric test for chloride ions demonstrates the desorption of chloride.

In summary, by adding HdSH to In(As, P) quantum dots provided with oleylamine and chloride ligands, the surface bound oleylamine ligands are protonated, the deprotonated thiolate $HdS^-$ binds to the surface of the quantum dots and the chlorides are replaced from the surface of the quantum dots.

In a further experiment, In(As, P) quantum dots are synthesized according to the same method as in the first example mentioned above, with the notable difference that $InCl_3$ is substituted by $InBr_3$.

In a 1D $^1$H-NMR experiment, the organic ligand of the synthesized quantum dots is identified to be tightly bound oleylamine. From X-ray Fluorescence experiments, it is identified that bromide is present on the purified quantum dots, similar to the chloride ligands identified by x-ray photoelectron spectroscopy above. The slight change in synthesis method thus also yields a hybrid surface chemistry, where bromide acts as X type ligand and oleylamine acts as the L type ligand.

The $^1$H-NMR spectrum is recorded again after addition of 1 equivalent UDA. The $^1$H-NMR spectrum shows the appearance of the same alkylammonium salt at 8 ppm, confirming that also in this case the ligand exchange is facilitated by the protonation of the surface bound L-type ligand.

The results suggest the same chemistry where L type ligands (olyelamine) and X type ligands (bromide) are displaced via the protonation of oleylamine and the binding of the deprotonated carboxylic acid.

A further third example illustrates the two phase exchange with mercapto-1,2-propanediol and n-butylamine in dimethylformamide (DMF).

First, purified In(As, P) quantum dots with oleylamine and chloride ligands are dispersed in n-octane.

A second solution is prepared by dissolving 50 microliters of 3-mercapto-1,2-propanediol and 10 microliters of n-butylamine in 3 mL dimethylformamide (DMF).

The dispersion of quantum dots in octane is placed on top of the DMF solution via pipetting. The two solutions form a 2-phase system due to the difference in polarity between n-octane and DMF. As octane has a lower density, it forms the top-most phase, with DMF resting underneath.

After shaking the vial, the black color of the In(As, P) quantum dots is transferred to the lower DMF phase, proving that the quantum dots are extracted to the DMF phase. Careful separation of the two phases via pipetting allows for a careful analysis of their respective contents.

Quantitative $^1$H-NMR spectroscopy of the octane phase shows that the oleylamine, initially present as L type ligand, remained in the octane phase after the quantum dots are extracted to DMF. $^1$H-NMR spectroscopy of the DMF phase shows broad resonances characteristic of surface bound 3-mercapto-1,2-propanediol and n-butylamine.

2D DOSY spectroscopy confirms that the small polar ligands are bound to the quantum dots, as they feature a diffusion coefficient that corresponds to the quantum dot diameter.

Absorption spectroscopy of the DMF phase demonstrates that the quantum dots are quantitatively extracted.

The binding of the small polar ligand 3-mercapto-1,2-propanediol extracts the quantum dots to the DMF phase, whereas the oleylamine remains in the octane phase. The excess of stabilizing agent butylamine compared to oleylamine acts here to soak up the proton, which explains the absence of oleylammonium in the octane phase.

The dispersion in DMF is purified by inducing precipitation with toluene.

After decantation and redispersion in DMF, a conductive thin film is produced by spincoating the ligand exchanged QD dispersion from DMF onto a substrate equipped with metallic contacts to measure the electrical properties of the film.

The invention claimed is:

1. A method to modify the surface of quantum dots, said method comprising the steps of:
   providing III-V quantum dots, said quantum dots having X type ligands and L type ligands at their outer surface, with X type ligands comprising ligands able to donate one electron to a quantum dot to which the X type ligand is bound and with L type ligands comprising ligands able to donate two electrons to a quantum dot to which the L type ligand is bound;
   dispersing said quantum dots in a solvent further comprising an additional compound to form modified quantum dots, said additional compound comprising an organic acid of formula RYH or an organic salt of formula RYH+Z−, said additional compound comprising at least one acidic proton H+ having a pKa in water equal or lower than 16 and said additional compound comprising a R-group comprising at least one carbon atom, with said organic acid of formula RYH being selected from the group consisting of carboxylic acids, sulfonic acids, thiols and phenols, with said organic salt of formula RYH+Z− comprising an organic ammonium ion RYH+ and a negatively charged counterion Z−;
   whereby during said dispersing said acidic proton H+ of said additional compound protonates at least part of said L type ligands to form protonated L type ligands and at least part of said X type ligands are replaced by deprotonated acid RY− of said organic acid of formula RYH or by counterion Z− of said organic salt of formula RYH+Z− and/or by deprotonated conjugated base RY of ion RYH+ of said organic salt of formula RYH+Z−.

2. The method according to claim 1, wherein at least part of the protonated L type ligands is removed from the outer surface of said quantum dots, simultaneously with the replacement of said X type ligands.

3. The method according to claim 1, wherein said X type ligands are selected from the group consisting of halides, carboxylates and thiolates and/or said L type ligands are selected from the group consisting of amines, phosphines and thiols.

4. The method according to claim 1, wherein said X type ligand comprises a halide and/or said L type ligand comprises an amine or a phosphine.

5. The method according to claim 1, wherein a salt of said protonated L type ligand and said X type ligand is formed during said dispersing.

6. The method according to claim 1, wherein said solvent comprises an apolar solvent or a polar solvent.

7. The method according to claim 1, wherein said method further comprises the step of:
   separating said modified quantum dots.

* * * * *